Patented Oct. 18, 1932

1,883,350

UNITED STATES PATENT OFFICE

HENRY DREYFUS, OF LONDON, ENGLAND

TREATMENT OF MATERIALS MADE OF OR CONTAINING CELLULOSE DERIVATIVES

No Drawing. Application filed March 12, 1927, Serial No. 175,014, and in Great Britain December 14, 1926.

This invention relates to the dyeing, printing or stencilling of threads, yarns, knitted or woven fabrics or other products made of or containing cellulose acetate or other organic acid esters of cellulose, such for example as cellulose formate, propionate or butyrate, or the product obtained by the treatment of alkalised cellulose with p-toluene sulphochloride (e. g. the product known as "immunised cotton"), or made of or containing cellulose ethers, such as methyl, ethyl, or benzyl cellulose, or the corresponding condensation products of cellulose and glycols or other polyhydric alcohols, all of which cellulose derivatives are hereinafter referred to as organic substitution derivatives of cellulose.

According to the present invention materials made of or containing one or more of the said organic substitution derivatives of cellulose are dyed or otherwise colored with coloring matters or compounds containing one or more omega-amino groups, that is to say compounds in which an aryl dye nucleus or component thereof is connected through a side chain to a basic amino group or a basic aliphatically substituted amino group. The linking chain may be a carbon atom or atoms alone or may contain in addition to carbon other atoms such as nitrogen or oxygen.

Further according to the invention such coloring matters may be produced on the fibre or material by combination of components one or more of which contain such ω-amino groups.

Such coloring matters or compounds may be produced by any convenient method. Thus for example they may be prepared by reduction of nitriles (e. g. by treatment of the nitrile in alcoholic solution with zinc and hydrochloric acid or with sodium). ω-Aminoalkylamino compounds may in some cases be produced by treatment of an amino compound containing or not containing an ortho carboxylic group or of a phenolic compound with an alkylene diamine in presence of a sulphite. ω-Aminoalkyl ether compounds or ω-aminoalkylamino compounds may be produced by treatment of a phenolic or amino compound with an amino alkyl halide.

It has been found that the introduction of the ω-amino group increases the suitability of coloring matters for cellulose esters and ethers. The affinity of the said coloring matters for the materials is increased and, what is frequently of even greater importance, the coloring matters are rendered more easily dispersible in aqueous media and their application consequently facilitated.

The following examples of dyestuffs for use according to the present invention and of the methods of preparing them are intended to illustrate the invention and not to be in any way limitative.

A. *Anthraquinone dyestuffs*

*Example 1.*—1-Methylamino-4-chloranthraquinone is heated for some hours at about 140° C. with cuprous cyanide in presence of pyridin. Ammonia is added to the reaction product. The nitrile obtained is then reduced with zinc and hydrochloric acid to obtain the dyestuff

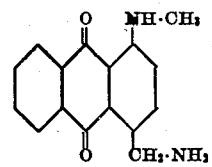

which can be used to dye cellulose acetate in red shades in the following manner:

75 grams of finely divided dyestuff are stirred with one kilogram of sodium sulphoricinoleate (50%). The mixture is heated until as homogeneous as possible and slowly diluted with boiling water to 10 litres. The whole is now added through a filter cloth to 125 litres of water and 5 kilograms of cellulose acetate yarn in hank form are entered. The temperature is raised during ¾ of an hour to 75–80° C. and after dyeing at this temperature for ¾ of an hour, the hanks are rinsed well, washed off in soft water and dried.

*Example 2.*—1.4-Aminohydroxyanthraquinone is boiled with chloracetyl chloride for ½ hour using xylene as diluent. The product is reduced to the leuco body and the latter heated under pressure with an alcoholic solution of methylamine. The product is oxidized to obtain the dyestuff

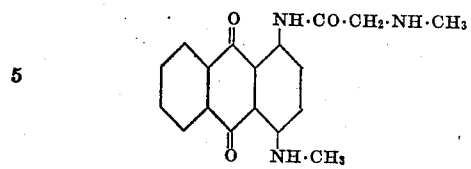

By using an amino alcohol instead of methylamine the solubility of the dyestuff may be increased. Thus if γ-amino-αβ-dihydroxypropane be employed the dyestuff

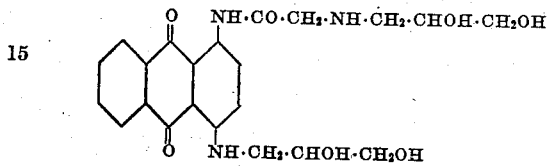

is obtained.

B. Azo dyestuffs

*Example 3.*—Potassium *p*-nitrophenolate is condensed with β-brom-ethylamine, the product reduced, diazotised and coupled with α-naphthylamine. Dyeings obtained with this dyestuff

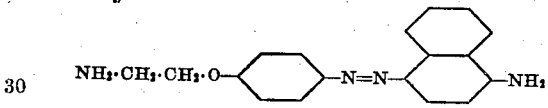

may be diazotised on the fibre and developed with any suitable developer, for example ω-aminoethylaniline.

*Example 4.*—o-Amino-α-phenylethylamine is diazotised and coupled with ω-aminoethylaniline in the form of its acetate to yield the dyestuff

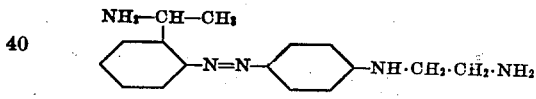

C. Miscellaneous dyestuffs

*Example 5.*—Anthrapyrimidone is condensed with epichloramine

to produce the dye

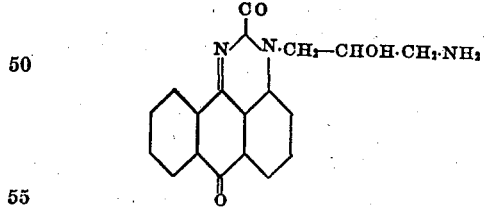

*Example 6.*—4.4′- Diamino-2′- nitrodiphenylmethane is condensed with excess of β-bromethylamine. The dyestuff obtained

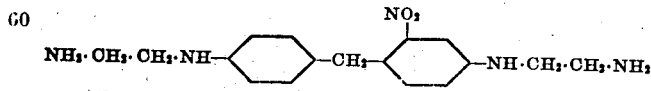

may be used for producing fast yellow shades on cellulose acetate artificial silk in the following manner:

100 grams of the finely powdered dyestuff are added to a dispersion of 5 cc. xylene in 400 cc. sodium sulphoricinoleate (50%). The whole is heated to 80–90° C. with stirring and stirred until as homogeneous as possible. It is then diluted to 10 litres with boiling soft water, stirred well and added through a filter cloth to a dye bath containing 300 litres of water. 10 kilograms of cellulose acetate yarn in hank form are now entered and the temperature raised to 75–80° C. during ¾ of an hour and maintained at that temperature for a further ¾ of an hour. The yarn is then lifted, washed thoroughly and dried.

*Example 7.*—Anthrapyridone is treated with epichloramine to obtain the dyestuff

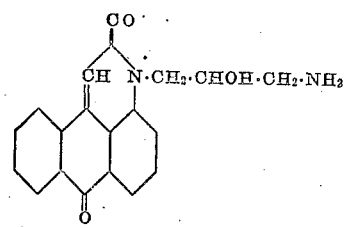

which gives yellow shades.

The dyestuffs may be applied to the goods in aqueous solution, i. e. in simple aqueous solution when they are sufficiently soluble or in the form of salts such as the hydrochlorides or acetates, or in aqueous suspension or they may be brought into colloidal solution by any of the methods known in the art such as by grinding (for example in colloid mills), by dissolving in a solvent and pouring into water containing or not containing protective colloids, by pretreating with solubilising agents, or by other methods. Of the solubilising agents which are suitable for obtaining such dispersions I may mention those described in U. S. Patents Nos. 1,618,413, 1,618,414 and 1,694,413 and British Patents Nos. 273,819 and 273,820 both filed April 10, 1926; viz. bodies of oily or fatty characteristics, namely higher fatty acids or sulphonated or other derivatives thereof containing salt-forming groups, such as sulphoricinoleic or other sulphonated fatty acids or salts of such acids or bodies, for instance their alkali or ammonium salts, used alone or in conjunction with auxiliary solvents as described in U. S. Patent No. 1,690,481 and application S. No. 152,517; carbocyclic compounds containing in their structure one or more salt-forming groups or salts of such compounds; sulpho-aromatic fatty acids or salts thereof; and soluble resin soaps or sodium or other soluble salts or soaps of resin acids.

Though in the above description dyestuffs belonging to particular series have been given and further aliphatic side chains which, in addition to the ω-amino group or groups, contain only hydrocarbon radicles or ether or alcohol or other amino groups have been described, it is to be understood that the invention extends to the use of dyestuffs of any series and to dyestuffs or components containing aliphatic side chains which, in addition to the ω-amino group or groups, may contain any other desired substituents.

The invention further comprises the dyeing or otherwise coloring of mixed goods comprising for example, in addition to one or more organic substitution derivatives of cellulose, silk, wool or cellulose fibres natural or artificial such as cotton or the cellulose type of artificial silk, in solid or contrasting shades according to the affinity of the non-ester and non-ether portion of the goods. The goods may be dyed with other dyestuffs for the non-ester and non-ether portion thereof either before, after or together with the dyestuffs of the present invention.

The term dyeing in the claims is to be understood to include printing and stencilling and also to include the case when the actual dye compound is produced on the material itself by interaction of components, as for example when dyeing by the azoic process.

What I claim and desire to secure by Letters Patent is:—

1. Process for dyeing material comprising an organic substitution derivative of cellulose, comprising dyeing the material with a coloring compound which comprises at least one basic amino group linked directly to carbon in a side chain.

2. Process according to claim 1, characterised in that the coloring compound is applied in aqueous solution.

3. Process according to claim 1, characterised in that the coloring compound is applied in aqueous colloidal solution.

4. Process for dyeing material comprising an organic substitution derivative of cellulose, comprising dyeing the material with an anthraquinone coloring compound which comprises at least one basic amino group linked directly to carbon in a side chain.

5. Process according to claim 4, characterised in that the coloring compound is applied in aqueous solution.

6. Process according to claim 4, characterised in that the coloring compound is applied in aqueous colloidal solution.

7. Process for dyeing material comprising cellulose acetate, comprising dyeing the material with a coloring compound which comprises at least one basic amino group linked directly to carbon in a side chain.

8. Process according to claim 7, characterised in that the coloring compound is applied in aqueous solution.

9. Process according to claim 7, characterised in that the coloring compound is applied in aqueous colloidal solution.

10. Process for dyeing material comprising cellulose acetate, comprising dyeing the material with an anthraquinone coloring compound which comprises at least one basic amino group linked directly to carbon in a side chain.

11. Process according to claim 10, characterised in that the coloring compound is applied in aqueous solution.

12. Process according to claim 10, characterised in that the coloring compound is applied in aqueous colloidal solution.

13. Material comprising an organic substitution derivative of cellulose, dyed with a coloring compound which comprises at least one basic amino group linked directly to carbon in a side chain.

14. Material comprising cellulose acetate, dyed with a coloring compound which comprises at least one basic amino group linked directly to carbon in a side chain.

In testimony whereof I have hereunto subscribed my name.

HENRY DREYFUS.